July 22, 1969
R. W. DOCHTERMAN
3,457,445
LAMINATED ROTORS AND STATORS WITH FLUX BARRIERS FOR
SYNCHRONOUS INDUCTION MOTORS AND METHOD
OF MAKING THE SAME
Filed Dec. 19, 1967
2 Sheets-Sheet 1
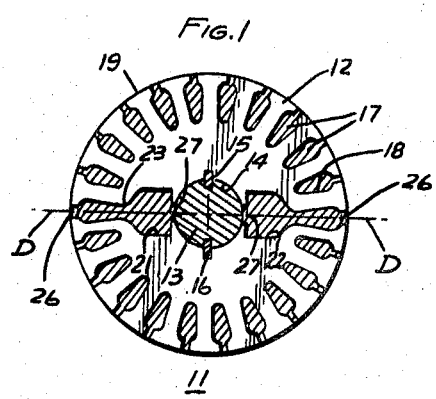
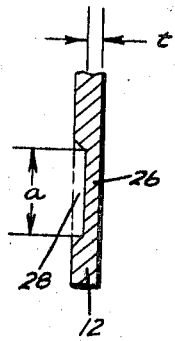
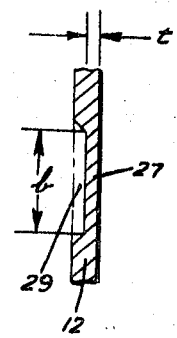
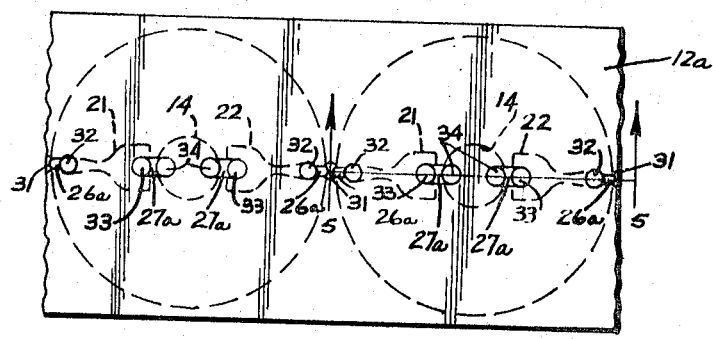
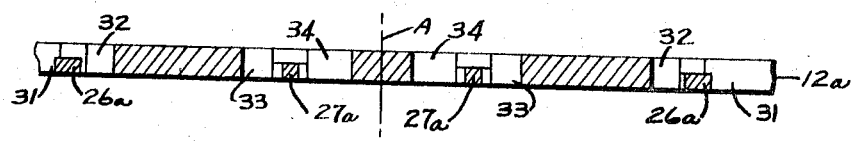
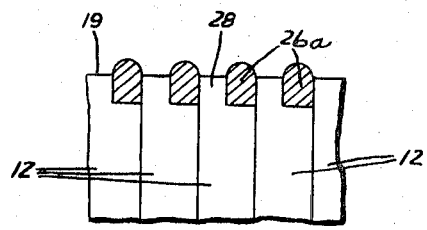
Inventor:
Richard W. Dochterman,
by John M. Stoudt
Attorney.

July 22, 1969
R. W. DOCHTERMAN
3,457,445
LAMINATED ROTORS AND STATORS WITH FLUX BARRIERS FOR
SYNCHRONOUS INDUCTION MOTORS AND METHOD
OF MAKING THE SAME
Filed Dec. 19, 1967
2 Sheets-Sheet 2
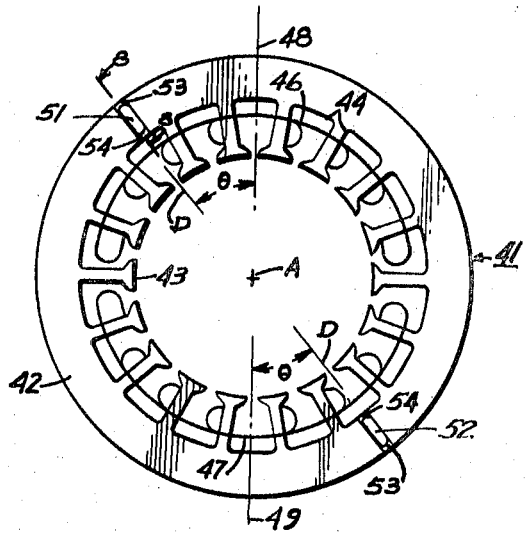
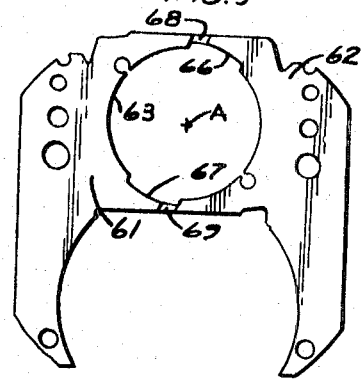
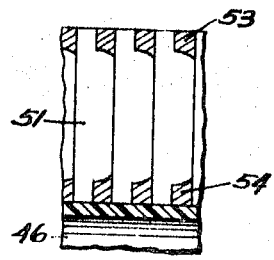
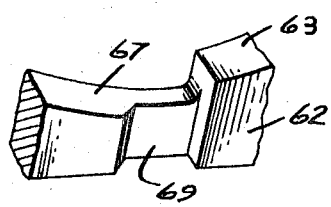
Inventor:
Richard W. Dochterman,
by John F. Stoudt
Attorney.

United States Patent Office 3,457,445
Patented July 22, 1969

3,457,445
LAMINATED ROTORS AND STATORS WITH FLUX BARRIERS FOR SYNCHRONOUS INDUCTION MOTORS AND METHOD OF MAKING THE SAME
Richard W. Dochterman, Fort Wayne, Ind., assignor to General Electric Company, a corporation of New York
Filed Dec. 19, 1967, Ser. No. 691,777
Int. Cl. H02k 1/22
U.S. Cl. 310—190          12 Claims

ABSTRACT OF THE DISCLOSURE

A laminated magnetic core formed of magnetic material for use in electrical inductive device as synchronous induction motor has a yoke formed with an opening through the core, for instance a reluctance slot extending across a portion of the yoke, with a magnetic bridge located near the opening structurally interconnecting two magnetic regions of the yoke. The bridge is dimensionally less in thickness than the magnetic material to reduce flux leakage in the vicinity thereof while still permitting fabrication of the individual laminations in one piece. By work hardening the cross-sectional area of the bridge, its structural strength is augmented, it has the ability to increase reluctance in the path of certain flux components during operation of the device for improving performance, and fabrication of the laminations is further facilitated.

Background of the invention

This invention relates to magnetic cores for electrical inductive devices having controlled magnetic paths and to a method of manufacturing the same. In particular, the invention relates to laminated magnetic cores formed with flux barriers to control the flux paths through the cores, and to a method of fabricating such cores.

Certain electrical inductive devices incorporate laminated magnetic cores having flux barriers to control the flux paths through the cores for furnishing low permeance or high reluctance magnetic paths. By way of illustration, synchronous induction motors of the type disclosed in the C. E. Linkous Patent 3,113,230 issued Dec. 3, 1963, and the F. W. Suhr et al. Patent 3,243,620 granted Mar. 29, 1966, are representative of those which include a rotor core having so-called reluctance slots in one form or another disposed across the magnetic yoke of the core near its direct axis, where maximum permeance occurs, to form magnetic polar segments and provide a high reluctance barrier in the magnetic path for the quadrature axis flux.

As mentioned in the Linkous Patent 3,113,230 ideally from the standpoint of performance, and the attainment of the highest possible reluctance for the quadrature axis flux, all magnetic material should be removed entirely across the laminations at the direct axes. However, it is generally the practice to punch out the individual laminations with a restricted interconnecting bridge section or region to permit each lamination to be stamped out of sheet material in a single piece. In actual practice, if the bridge is to remain in the finished rotor core, then it is located adjacent the aperture receiving the shaft. For manufacturing reasons, the radial width at the narrowest part of the bridge section adjacent the shaft aperture is seldom made greater than the dimensionl thickness of the individul laminations, for instance 0.025 inch. While the remaining bridge section is usually sufficiently small to saturate during operation, it does tend to permit flux leakage from one axis to another which decreases the magnitude of the attainable reluctance in turn causing some loss in synchronous output, among other things.

If, on the other hand, the bridge section is not retained in the finished rotor core but is removed by a machining operation once the squirrel cage winding of the rotor has been provided, then it is normaly disposed externally of the laminations, next to the outer core periphery as shown in FIGURE 3 of the Suhr et al. Patent 3,243,620. In this latter approach, while a benefit in improved performance is achieved by elimination of the bridge sections, a somewhat weaker structure results since in the finished core the magnetic segments are not integrally interconnected by magnetic material.

It would therefore be quite desirable if a laminated core were fabricated with laminations having interconnecting bridge sections which permit manufacture of the individual laminations in a single piece, yet at the same time allow a reduction in the magnitude of the flux leakage from one axis to another in their vicinity when the sections are retained in the finished core. It is further desirable that the tendency of the bridge sections to adversely affect performance of the electrical device incorporating them be diminished. These desirable features should be obtained as economical as possible while permitting efficient mass production manufacture of the laminated cores.

Summary of the invention

It is therefore an object of the present invention to provide an improved magnetic core having controlled magnetic paths therethrough and the improved method of manufacturing such cores. It is a more specific object of the invention to provide an improved laminated magnetic core and a method of its manufacture which overcome the problems and furnish the desirable features mentioned above.

It is another specific object of the present invention to provide an improved laminated core having magnetic bridge sections which have a reduced tendency to produce flux leakage in their vicinity and to adversely affect performance of the electrical inductive device incorporating such cores.

It is also an object of the invention to provide an improved method of manufacturing laminated cores which permits fabrication of the individual laminations in single pieces and furnishes the electrical inductive device incorporating such cores with improved operating characteristics.

In carrying out the invention in one form I provide an improved laminated magnetic core for use in an electrical inductive device, fabricated from a number of laminations of magnetic material having selected dimensional thicknesses. The core includes a yoke having at least one preselected opening extending axially through the core, for example, a reluctance slot provided across a major part of the yoke to produce a number of magnetic regions in effect separated by the slot. These regions are structurally interconnected by at least one magnetic bridge of predetermined cross-sectional area disposed next to a peripheral surface of the core and the opening. The bridge is dimensionally less in thickness than the selected dimensional thickness to reduce flux leakage in its vicinity thereby improving operating performance of the device. This construction also permits fabrication of the individual laminations in single pieces to facilitate their fabrication.

By furnishing the bridge with a work hardened cross-sectional area having internal stresses, the structural strength and rigidity of the bridge as well as the core are augmented and the reluctance in the path of certain flux components, for example quadrature axis flux, is increased.

With respect to one method of fabricating the laminations for use in the core, holes are cut through the sheet of magnetic material from which the laminations are to be formed, next to locations where the bridges will ultimately be disposed. The thickness of the laminations at the bridge location is reduced and the cross-sectional area work-hardened by a cold working operation, such as by coining these locations, the coined magnetic material being permitted to flow into the holes. The desired lamination configurations are subsequently produced by stamping out additional material and, if desired, the laminations are annealed whereby a partial but not entire stress relief of the cross-sectional areas may be effected. This fabrication may be achieved economically and efficiently, with the laminations being provided in single pieces to facilitate manufacture of the core.

The subject matter which I regard as my invention is set forth in the appended claims. The invention itself, however, together with further objects and advantages thereof may be better understood by referring to the following more detailed description taken in conjunction with the accompanying drawings.

Brief description of the drawings

FIGURE 1 is a cross-sectional view of a laminated rotor for use in a synchronous induction motor embodying one form of the present invention, the view being taken in a plane normal to the axis of rotation for the rotor;

FIGURE 2 is an enlarged fragmentary view in section of a radially and axially restricted magnetic region or bridge of the core, dimensionally less in thickness than the thickness of the individual laminations and being located at the outer core peripheral surface in the vicinity of the direct axis;

FIGURE 3 is an enlarged fragmentary view in section of another radially and axially restricted magnetic bridge of the core disposed next to an inner peripheral surface of the core in the vicinity of the direct axis;

FIGURE 4 is a plan view of a strip of magnetic material being fabricated into the core of FIGURE 1, the view showing the material after the reduced thicknesses of the bridges seen in FIGURES 2 and 3 have been provided by a progressive punching and coining operation;

FIGURE 5 is a sectional view taken along line 5—5 in FIGURE 4;

FIGURE 6 is an enlarged fragmentary view of laminations in stacked relation prior to the casting operation for forming the winding for the core of FIGURE 1;

FIGURE 7 is an end elevational view of a stator, partially in schematic form, illustrating another form of the invention incorporated in a laminated core for use in a two pole single phase induction electric motor;

FIGURE 8 is an enlarged view taken along line 8—8 in FIGURE 7;

FIGURE 9 is an end elevational view of a stator core lamination for use in a fractional horsepower size shaded pole type electric motor showing another form of the present invention; and FIGURE 10 is an enlarged view in perspective of a part of the lamination seen in FIGURE 9 to reveal details.

Description of the preferred embodiments

Turning now to the drawings in more detail, and in particular to FIGURES 1–6 inclusive, one form of the invention has been illustrated in connection with a laminated core of a rotor member 11 for use in a small horsepower two pole single phase synchronous induction electric motor. As seen in FIGURE 1, member 11 includes a laminated core fabricated from a stack of secured together laminations 12 composed of magnetizable iron, electrical steel or like material, preferably attached in skewed relation to a central shaft 13 rotatable about axis A by any suitable means, such as by a friction engagement between an inner peripheral surface 14 of a shaft receiving bore and the shaft as well as by a pair of keys 15, 16 frictionally received in opposed grooves of the stack and shaft. The core carries a squirrel-cage type secondary winding formed of nonmagnetic electrically conductive material for instance case aluminum, having a number of angularly spaced apart conductors 17 disposed in winding slots 18 located near outer peripheral surface 19. The conductors are short-circuited at each end of the core by end rings, such as those revealed in the Linkous patent.

In the illustrated embodiment of FIGURE 1, a pair of enlarged openings 21, 22 form reluctance or dividing slots extending radially outward from inner peripheral surface 14 toward surface 19 at the direct polar axis D for a major part of the distance transversely across the rotor yoke. The outermost part of openings 21, 22 also serve as winding slots which converge inwardly in neck 23. These openings in effect divide the core into two magnetic polar regions symmetrical about axes D, the magnetic regions on either side of a given opening being structurally interconnected by integral magnetic bridge sections 26, 27 provided in each lamination respectively located in the vicinity of peripheral surfaces 19, 14.

The bridge sections 26, 27 of the individual laminations are each of reduced cross-sectional area, with the axial dimensional thickness of the magnetic material from which the laminations are fabricated. By way of illustration, assuming a rotor core nominal diameter of 2.01 inches, a bore diameter of 0.498 inch and a lamination thickness of 0.025 inch, the nominal dimensions (in inches) of bridge section 26 may be as follows: length $a=0.065$; radial width at narrowest part 0.02; and thickness $t=0.011$. With regard to bridge section 27, it may be as follows: length $b=0.125$; width$=0.02$; and $t=0.011$, all in inches. In addition, nonmagnetic material, for instance cast aluminum, is also furnished in openings 21, 22. In view of spaces 28, 29 formed between next adjacent laminations at the bridge sections 26, 27 due to the axial reduction in thickness $t$ at that location (see FIGURES 2 and 3) nonmagnetic material will extend into these spaces.

With the foregoing construction, flux leakage from one axis to another at the bridge sections is reduced even though there are two sections at each reluctance slot which structurally connect the two adjacent magnetic regions and permit fabrication of the laminations in single pieces. The openings 21, 22 and material therein serve as a barrier to the quadrature axis flux since a high reluctance is produced to such flux. The bridge sections by virtue of their construction explained above tend to augment the reluctance in the path of the quadrature polar axis flux thereby improving performance of the motor. It has been found in actual practice that by providing work hardened cross-sectional areas for the bridge sections which have internal stresses, not only is the structural strength or rigidity of the laminations and core augmented in the vicinity of the bridge sections, but also the work hardened areas tend to further increase reluctance in the path of the quadrature flux component. As will be seen hereinafter, the work hardened areas may be produced by a cold working operation, such as the well known coining operation.

In order to further demonstrate the advantages of the present invention when incorporated in a rotor core of a single phase synchronous induction motor, the following test results are given, which are representative of a number of tested motors. Tested motor A incorporated a rotor core built in accordance with the illustrated embodiment of FIGURES 1–3 while tested motor B differed in construction from motor A only in certain structural features concerning the magnetic bridge sections. In particular, motor A had bridge sections of reduced thickness (e.g. 0.011 inch) and work hardened cross-sectional areas produced by a coining procedure. Motor B, on the other hand, had bridge sections dimensionally similar to those of A except that the bridge thickness was the same as the original thickness of the laminations, 0.025 inch, and the cross-sectional areas were completely stress relieved. The conductors were skewed 22.4 electrical degrees in the rotor cores of both motors, with identical stack lengths of 1.875 inch. All other dimensions were similar to those already noted and the secondary windings were formed of cast aluminum. Motors A and B started and reached synchronous speed within three seconds at 103 volts and 60 c.p.s. The comparative data for the two representative motors is set out below:

| Performance Data | Motor A | Motor B |
| --- | --- | --- |
| Watts-in at no load | 25.8 | 25.2 |
| Watts-in at full load, torque of 14 ounce-inches | 73.5 | 75.4 |
| Load angle (deg.) | 15 | 19 |
| Slip (oz. ft.) | 2.30 | 2.14 |
| 127 v. watts, no load | 46.8 | 44.2 |
| Pull-in torque (oz. ft) | 1.72 | 1.504 |
| Pull-out torque (oz. ft.) | 1.742 | 1.525 |

From the above it will be realized by those skilled in the art that motor A constructed in accordance with one form of the present invention required less power input than that for motor B under full load conditions and exhibited less power loss in the form of heat. In spite of this, motor A had higher pull-in and pull-out torque characteristics. The load angle of motor A, that is the angle assumed by the rotor with respect to the stator field under full load conditions when running at synchronous speed, was 15° as compared to 19° for motor B. Consequently, motor A which incorporated the present invention had significantly improved performance characteristics over that of motor B.

Turning now to another aspect of the present invention, and in particular to FIGURES 4-6 inclusive, an improved method has been illustrated of fabricating laminations 12 and core 11 of the exemplification shown in the first three figures. More specifically, a sheet of magnetic material 12a having the desired lamination thickness, for instance 0.025 inch, is provided with at least one and preferably two holes 31, 32 and 33, 34 positioned next to locations 26a and 27a which will ultimately become the bridge sections in the finished core. The holes may be cut into the sheet on either side of locations 26a, 27a by cutting or otherwise removing material employing any common cutting or stamping operation.

Thereafter, bridge locations 26a and 27a are reduced in thickness the desired amount by a cold working operation, such as by coining these locations, which tends to force some of the displaced material into the adjacent hole or holes to permit the reduction in cross-sectional area. The coining operation concurrently produces work hardened cross-sectional areas of reduced sizes having internal stresses for the bridge sections. The desired overall lamination configuration and additional openings, including the center aperture, reluctance and winding slots, may be furnished by subsequent cutting operations, by way of example, a conventional progressive die arrangement which stamps out the laminations progressively in a line from a sheet of magnetic material.

Before assembling the proper number of the laminations into stacked relation to form the desired stack length, if desired, the laminations may be annealed by a conventional anneal procedure for stress relief purposes in view of the prior cutting operations. However, this anneal, while achieving this purpose, should only partially relieve the internal stresses introduced into the work hardened cross-sectional areas of the bridge sections when the section areas have been cold worked so that the strength and reluctance benefits mentioned above are still present to a satisfactory degree. By way of illustration, in a conventional anneal laminations are normally subjected to a temperature in the range of approximately 750-800° centigrade for a one hour period. While this anneal effects stress relief of the laminations resulting from the cutting operations previously mentioned, it will only partially affect the internal stresses introduced into the bridge sections by the cold working procedure.

Once the proper number of laminations have been properly aligned in stacked relation (FIGURE 6) and the winding provided in the stack, as by a casting operation in regard to aluminum material, as well as the provision of nonmagnetic material (e.g., aluminum) cast or otherwise furnished into openings 21, 22, the outer peripheral surface 19 of the more may be turned down to an accurate dimension. This may be accomplished by machining or in any other suitable manner (e.g., grinding) to provide a finished, accurately dimensioned and smooth outer cirmumference or periphery for the rotor core. It should be noted at this time that since the temperatures involved in the casting operation referred to above are usually well below that which will further stress relief the cross-sectional areas of the bridge sections, these areas in the finished core will retain about the same degree of work hardening as they included immediately following the lamination anneal. Consequently, as suggested by the foregoing, the laminations may be inexpensively and efficiently fabricated in single pieces, and the rotor core economicaly manufactured to produce a high quality product on a mass product basis.

FIGURES 7 and 8 show another form of the present invention in connection with a stator for use in a single phase induction electric motor of the type more fully disclosed in the co-pending U.S. application S.N. 555,732 filed June 7, 1966, of Doran Hershberger. The stator has a laminated magnetic core 41 formed with a yoke section 42, an inner peripheral surface or bore 43, and a number of angularly spaced apart winding slots accommodating two coil groups 46, 47 disposed symmetrically about coil group axes 48, 49. Openings 51, 52 produce reluctance slots located at angle $\theta$ from coil group axes 48, 49 in the direction of rotation of the revolvable member, extend transversely across the yoke section for a major part thereof near the direct axes D. This furnishes a reluctance in the magnetic path of the quadrature axis flux component and effects a phase shift in the flux components during starting conditions.

Magnetic bridge sections 53, 54 capable of reducing flux leakage from one axis to another, are located adjacent each peripheral surface to structurally interconnect the magnetic regions on either side of openings 51, 52. Nonmagnetic material may be furnished in the openings if desired. As seen in FIGURE 8, like the first embodiment, these bridge sections are dimensionally less in axial thickness than the original thickness of the laminations, and their reduced cross-sectional areas are cold worked to augment the structural and reluctance characteristics of the core. The laminations may be fabricated in the manner already explained. Thus, improved performance, among the other beneficial features already outlined in connection with the first embodiment, may be furnished for the core of this embodiment.

FIGURES 9 and 10 reveal another embodiment in regard to a magnetic stator lamination 61 adapted to be incorporated in a shaded pole electric motor of the type more fully disclosed in the Myron D. Tupper Patent 3,024,377 isued Mar. 6, 1962. The illustrated lamination, and consequently the core when the desired number of laminations are stacked together, has a yoke section 62, an inner peripheral surface or bore 63, and openings 66, 67 forming reluctance gaps or slots next to bore 63, with magnetic bridge sections 68, 69 structurally interconnecting adjacent magnetic regions of the yoke section located on either side of openings 66, 67. As in the other embodiments, the radially narrowest parts of the magnetic bridge sections 68, 69 are dimensionally less in axial thickness than the thickness of the laminations, preferably in the order of one-half or less to derive the best reluctance benefits therewith while still retaining sufficient structural strength to hold adjacent magnetic regions together in a unitary lamination. By incorporating worked hardened reduced cross-sectional areas for magnetic bridge sections, their structural strengths may be augmented and the reluctance characteristics further improved.

Thus, the present invention provides an improved magnetic core having magnetic bridge sections interconnecting magnetic regions which tend to reduce flux leakage from one axis to another and still augment the structural strength of the individual laminations and finished core. Further, laminations for the core may be fabricated in single pieces on a mass production basis, easily assembled, and the core efficiently and economically manufactured. Moreover, the core provides the electrical inductive device in which it is incorporated with improved operating characteristics in spite of the retention of the magnetic bridge sections in the finshed core.

It should be apparent to those skilled in the art that while I have shown and described what at present is considered to be the preferred embodiments of my invention in accordance with the patent statutes, changes may be made in the structure disclosed without actually departing from the true spirit and scope of this invention. In addition, while the illustrated embodiments are in connection with two pole magnetic cores, the invention is of course not intended to be limited thereto and may be employed in magnetic cores having other than two polar regions. I therefore intend to cover in the following claims all such equivalent variations as fall within the invention.

What I claim as new and desired to secure by Letters Patent of the United States is:

1. A magnetic core for use in an electrical inductive device comprising a stack of secured together laminations formed of magnetic material each having a selected dimensional thickness, said laminations including a yoke section having at least one preselected opening extending in alignment through the stack to produce a number of magnetic regions, and magnetic bridge sections of predetermined cross-sectional areas formed in the individual laminations adjacent the at least one preselected opening structurally interconnecting adjacent magnetic regions, said magnetic bridge sections being dimensionally less in individual thickness than the selected dimensional thickness of the individual laminations to reduce flux leakage in the vicinity thereof.

2. The magnetic core of claim 1 in which said magnetic bridge sections are coined to augment the structural strength thereof and are disposed adjacent the at least one opening at two locations to facilitate fabrication of the individual laminations in one piece.

3. The magnetic core of claim 1 wherein the magnetic core is a rotor core for use in a synchronous induction electric motor having direct and quadrature axes and having a plurality of slots accommodating a cast squirrel cage secondary winding formed of nonmagnetic material, the at least one preselected opening aligned through the stack of laminations forms a reluctance slot extending transversely across the yoke section for a major part thereof in the vicinity of the direct axis, to create a high reluctance in the path of the quadrature axis flux component, with nonmagnetic material being disposed in the reluctance slot magnetic bridge sections of adjacent laminations.

4. The magnetic core of claim 1 wherein the magnetic core is a stator core having at least one slot accommodating a primary winding forming at least two magnetic poles, the at least one preselected opening aligned through the stack of laminations forming a reluctance slot which extends transversely across the yoke section for a major part thereof in the vicinity of each magnetic pole, said magnetic bridge section augmenting the reluctance produced by the reluctance slot during excitation of the primary winding and facilitating the fabricating of the laminations in single pieces.

5. A magnetic core having a predetermined axis comprising: a body of magnetic material formed with a selected thickness as measured in the general direction of the axis including one or more preselected openings therethrough and at least one magnetic bridge of predetermined cross-sectional area disposed adjacent the one or more preselected openings, said at least one magnetic bridge being dimensionally less in thickness in the direction of the predetermined axis than the dimensional selected thickness of the body, to reduce flux leakage in the vicinity of said at least one magnetic bridge.

6. The magnetic core of claim 5 in which the cross-sectional area of said at least one magnetic bridge is work hardened by cold working thereof to augment the structural strength of the at least one magnetic bridge and to increase reluctance in the vicinity of the at least one preselected opening.

7. The magnetic core of claim 5 in which the body of magnetic material includes a yoke having a peripheral surface, the at least one or more preselected openings comprising at least one reluctance slot extending transversely across a major part of the yoke and terminating near the yoke peripheral surface to produce high reluctance in the path of some of the flux generated in the core, and said at least one magnetic bridge is disposed at the peripheral surface and is work hardened to augment the structural strength of the yoke and to increase the reluctance in the path of certain flux components.

8. The magnetic core of claim 5 having an aperture therethrough to provide an inner peripheral surface with an outer peripheral surface of the core, the one or more preselected openings being formed in the core adjacent at least one of the peripheral surfaces, the at least one magnetic bridge structurally interconnecting magnetic regions disposed near the one or more preselected openings together, and the at least one magnetic bridge being coined to produce a work hardened cross-sectional area thereof for augmenting its structural strength and to further reduce flux leakage in its vicinity.

9. A method of making laminations for use in magnetic cores from a thin sheet of magnetic material having a selected dimensional thickness comprising the steps of: cutting at least one hole through the material adjacent a first preselected location adapted to form a magnetic bridge interconnecting two magnetic regions in the laminations; producing a thickness of the first preselected locations less than the selected dimensional thickness of the magnetic material; and cutting said sheet of magnetic material to remove portions of said material at other preselected locations to form laminations having desired configurations with openings therethrough and with magnetic bridge sections of reduced cross-sectional areas with said first preselected locations for integrally joining the magnetic regions together in unitary structures.

10. The method of claim 9 in which the first preselected locations are produced by cold working thereof to produce work hardened cross-sectional areas having internal stresses.

11. The method of claim 10 in which the work hardened cross-sectional areas are produced by a coining operation.

12. The method of claim 10 in which the laminations are subsequently annealed to effect a partial but not entire stress relief of the work hardened cross-sectional areas.

References Cited

UNITED STATES PATENTS

| | | | |
|---|---|---|---|
| 2,927,229 | 3/1960 | Merrill | 310—42 X |
| 3,047,755 | 7/1962 | Angst et al. | 310—162 |
| 3,210,584 | 10/1965 | Jorgensen et al. | 310—265 |
| 3,243,620 | 3/1966 | Suhr et al. | 310—265 X |

WARREN E. RAY, Primary Examiner

U.S. Cl. X.R.

29—596, 598; 310—216, 254, 265